G. H. Christian.
Pen Holder.
Nº 36,507. Patented Sept. 23, 1862.
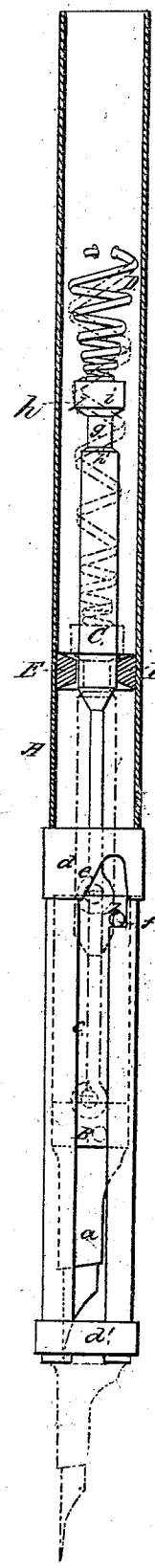

UNITED STATES PATENT OFFICE.

GEORGE H. CHRISTIAN, OF NEW YORK, N. Y.

PENHOLDER.

Specification of Letters Patent No. 36,507, dated September 23, 1862.

*To all whom it may concern:*

Be it known that I, GEORGE H. CHRISTIAN, of the city, county, and State of New York, have invented a new and Improved Penholder; and I do hereby declare that the following is a full, clear, and exact description of the same, reference being had to the accompanying drawings, making a part of this specification.

The drawing represents a side elevation of my invention partly in section.

The object of this invention is to provide a protection to the point of the pen when the same with the holder accidentally drops down.

The invention consists in the arrangement of a sliding weight furnished in one end with a socket to receive the pen in combination with a weak spring connecting said weight with the tubular case in such a manner that when the case is held in an upright position, the weight overcomes the power of the spring and the pen protrudes beyond said case ready for use but if the holder drops down, the action of the spring on the weight and on the case is such that the weight recedes and the point of the pen is protected from injury.

The invention consists further in the arrangement of a neck with inclined shoulders in the rod connecting the weight with the spring in combination with an annular guide having its ends inclined toward the center in such a manner that when the weight is down and if the case is held in an inclined position said neck and annular guide prevent the weight with the pen receding spontaneously.

It consists also in the arrangement of an inclined plane and recess in the tube in combination with a pin projecting from the side of the weight in such a manner, that when the weight recedes, the inclined plane causes the pin to catch in the recess and the weight and pen are retained in the case.

To enable those skilled in the art to make and use my invention I will proceed to describe its construction and operation with reference to the drawing.

My pen holder consists of a tubular case A, of sheet brass, silver, gold or any other suitable material, in which the weight B, slides freely up and down. This weight is provided with a socket $a$, of suitable form to receive the pen and it is guided in its up and down motion by a pin $b$, projecting through a slot $c$, in the side of the case A. Rings $d$, $d'$, which are secured to the case one at its lower end and the other at a certain distance from the same limit the up and down motion of the weight. The ring $d$, is provided with a notch, one side of which forms an inclined plane $e$, and as the pin $b$, strikes this inclined plane it is deflected toward one side and made to catch in a recess $f$, in one side of the slot $c$. The weight B, connects by a rod C, with a volute spring D, which is so weak that on turning the holder up in a vertical position the weight B, is capable of stretching the same quite easily and sinking down until the upper thick end or head $i$, of the connection rod C, strikes the annular guide ring E. This guide ring is firmly secured to the inside of the case A and its opening is large enough to allow the connection rod C, to play freely up and down. This connection rod is hinged to the weight B, and it is provided with a neck $g$, with inclined shoulders $h$, $h'$, close under the head $i$, so that when the weight B, is down and the holder is brought in an inclined position the neck $g$, catches in the guide ring E, and prevents the weight from receding spontaneously when the pen is used. The ends of the guide ring are also turned in or countersunk so that the connection rod C, slides easily in said ring, whenever the holder is brought to an upright position.

The operation is as follows: When the pen is to be used, the pin $b$, is turned out of the recess $f$, and by holding the case in an upright position, the weight B, drops down until the head $i$, of the connection rod strikes the ring E. If the holder is now brought in an inclined position the neck $g$, catches in the ring E, and the pen when used is not liable to recede spontaneously. If the pen holder drops down accidentally, the superior gravity of the weight B, causes it to turn in an upright position so as to release the neck $g$ from the ring E, and if the holder continues to fall in this position, the weight E, with the pen recedes and by the time said holder reaches the floor the point of the pen has entered the case A, and the pen $b$, has passed up the inclined plane $e$, to a point above the recess $f$ and the pen is thus perfectly protected by the case A.

The cause of the receding motion of the weight B, during its fall will be readily understood from the following observation. If two weights of the same specific gravity are tied together by a cord and suspended by holding one of the weights between the thumb and fingers, the cord will be stretched and if the weights are now dropped in a vertical direction both assume the same velocity and they do not approach each other until the motion of the lower weight is checked when the same strikes the ground. If instead of a cord a spring is used for connecting the two weights, and said weights are held in a vertical position, the spring will be stretched by the action of the lower weight and if the weights are now dropped, said spring has a tendency to draw the two weights together and consequently the upper weight is subjected to the force of the gravity plus one half (provided the weights are equal) the force of the spring and the lower weight to the force of the gravity minus one half the force of the spring or in other words the motion of the upper weight will be accelerated by the action of the spring whereas the same action will retard the motion of the lower weight and consequently the two weights will approach each other during the fall.

In my pen-holder the motion of the case A, is accelerated by the spring and that of the weight B is retarded and therefore the pen recedes during the fall.

This holder is particularly intended for gold pens which are liable to become spoiled or to have their points broken by accidentally dropping down.

Having thus fully described my invention what I claim as new and desire to secure by Letters Patent is—

1. The arrangement and combination of the tubular case A, sliding weight B, and spring D, constructed and operating substantially as and for the purpose described.

2. The arrangement of the neck $q$, with inclined shoulders $h$, $h'$, on the connecting rod C, in combination with the guide ring E, in the interior of the tubular case A, substantially as and for the purpose herein specified.

3. The arrangement of the inclined plane $e$, and recess $f$, in combination with the pin $b$, the sliding weight B, and tubular case A, substantially as and for the purpose set forth.

GEO. H. CHRISTIAN.

Witnesses:
J. W. COOMBS,
WM. TUSCH.